Aug. 17, 1937.     O. HAUCKE     2,090,294
WHEEL CENTERING AND CAMBER GAUGE
Filed Nov. 3, 1936
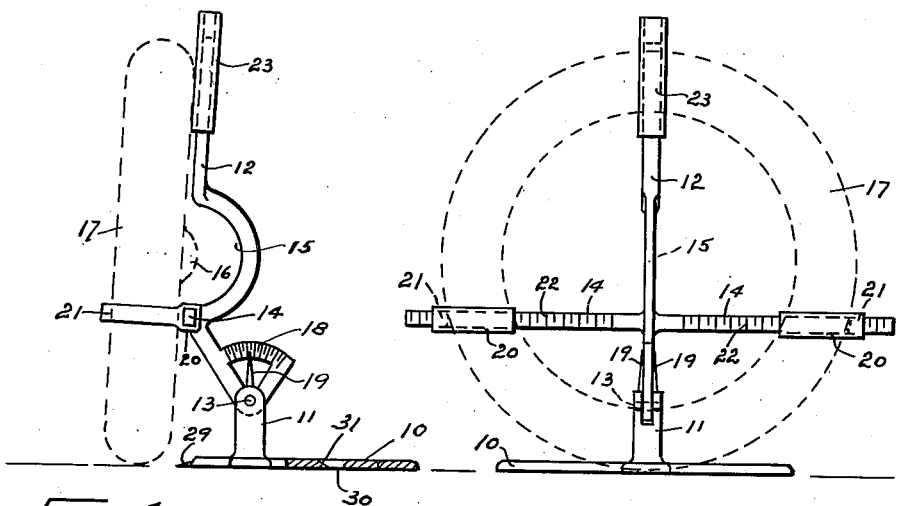
Fig 1    Fig 2
Fig 4
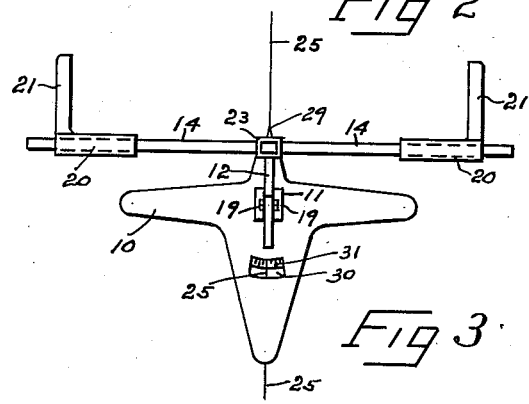
Fig 3
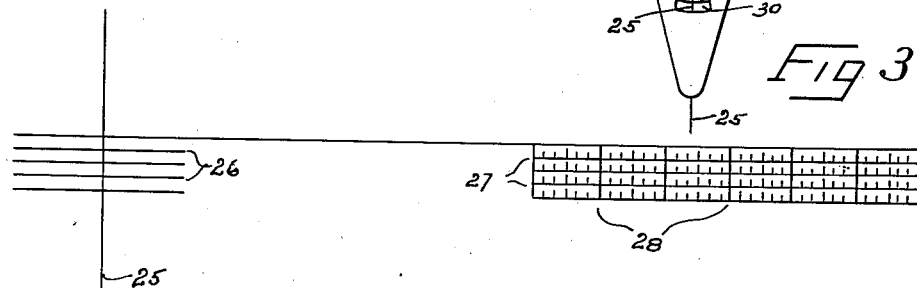
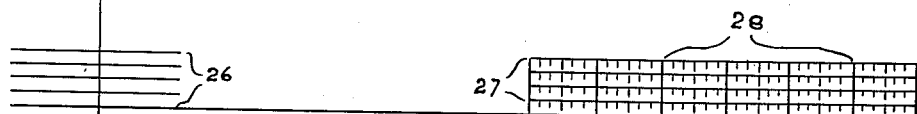
Fig 5
INVENTOR.
Oswin Haucke
BY *[signature]*
ATTORNEYS.

Patented Aug. 17, 1937

2,090,294

REISSUED

UNITED STATES PATENT OFFICE 2,090,294

WHEEL CENTERING AND CAMBER GAUGE

Oswin Haucke, Brooklyn, N. Y.

Application November 3, 1936, Serial No. 108,921

6 Claims. (Cl. 33—203)

The invention relates to gauges for centering vehicle wheels and for ascertaining the camber and other angles of such wheels. It has for its main object to provide a gauge of extremely simple construction by means of which wheels of an automotive or other vehicle may be readily checked as to their proper alignments and angles. Another object is to provide a gauge which may be used for wheels of all sizes and types.

A further object is to provide a gauge which is easy to operate, readily portable, and which can be operated without any great skill or experience on the part of the operator. Additional objects are to provide a gauge of rugged construction, which has no parts readily broken or apt to get out of order, which occupies but small space and which can be manufactured at a relatively low cost.

These and various other objects and advantages will be readily understood from the following description and from the accompanying drawing of a preferred embodiment of the invention, in which, however, modifications may be made without departing from the scope of the appended claims. In the drawing Fig. 1 is a front elevation showing the gauge as used when checking the camber angle of a wheel, Fig. 2 is a side view of the gauge, Fig. 3 is a plan view, Fig. 4 is a fragmental, enlarged view showing the construction of one of the members used with the gauge, and Fig. 5 is a plan view of a floor scale which may be used in combination with the gauge.

Referring now to Figs. 1, 2 and 3, the gauge consists of a base 10 having a pedestal bearing 11 in which a gauge arm 12 is rotatingly mounted on a pivot 13. The gauge arm is provided with two lateral members 14 and the arm itself is offset, as shown at 15, to accommodate a hub of any size, such as for example the hub 16 of the wheel 17 against which the gauge is shown. A scale 18 is formed on the gauge arm and pointers 19 are mounted on the pedestal 11. I preferably imprint a scale on both sides of the gauge arm and use two pointers, as shown in Figs. 2 and 3, so that the scales may be read from either side.

When placing the gauge arm against the upper part of the wheel and the two transverse members against the side of the wheel, it is evident that the camber angle of the wheel will be automatically indicated on the scale 18.

To ascertain the alignment of the front and rear axle I employ the contact members 20 which are slidingly mounted on the transverse members 14. Each of these contact members is provided with an arm 21 which projects at right angles to the transverse members when the contact members 20 are moved along these. I also employ the scale diagram shown in Fig. 5. This diagram may be imprinted on a platform suitable for supporting a car, but I prefer to place the diagram directly on the floor, either by inserting the lines in the concrete of the floor or by merely painting them thereon.

The transverse members 14 are provided with scales 22 so that the contact members 20 may be spaced an equal distance from the gauge arm 12 by means of these scales and a sleeve 23 is slidingly mounted on the upper end of the gauge arm. This sleeve is preferably held in frictional engagement with the arm by means of a flat spring 24, as illustrated in Fig. 4, so that the sleeve may be held in any desired position on the arm.

Referring now particularly to Fig. 5, the line 25 is used as an indicating line for one of the sets of wheels, as for example the front wheels. The longitudinal lines 26 and 27 are used to indicate the distance between the sets of wheels, as for example 56, 58 or 60 inches. The transverse lines 28 are used to indicate the distance between the front and rear axle. In other words, the diagram is used to indicate the wheel base of the car.

If it is now desired to check up the alignments of the wheels of an automobile, the automobile is placed on the scale diagram, shown in Fig. 5, preferably with the front wheels on the lines 26 and with the rear wheels on the lines 27. When properly placed this will indicate the distance between each respective set of wheels.

The gauge is now placed against one of the front wheels, as shown in Figs. 1 and 2, and the contact members are placed an even distance from the gauge arm 12 so that this will be right in the center of the wheel. The car and the gauge is now moved until a pointer 29, formed on the front end of the base, coincides with the line 25. The other front wheel is similarly aligned so that both the centers of the front wheel coincide with the line 25. By using the gauge in a similar manner on the rear wheels, the scales, indicated by the lines 28, will show whether or not the front and rear axles are parallel. Thus the parallelism of the axles may readily be established by means of the gauge.

An opening 30 is formed in the base 10 and one edge of this opening is provided with a scale 31. When the wheels are tested and the pointer 29 is directly on the line 25 the "toe-in" of the wheel may be ascertained by comparing the scale 31 with the line 25 which is visible through the opening 30. Thus, not only will the gauge indicate the camber angle of the wheels and the parallelism of the axles, but the amount of "toe-in" of the wheels as well.

The object of the sleeve 23 is to make it convenient to use the gauge on automobiles having very low fenders. In such cases the sleeve is lowered on the gauge arm to enable the arm to be swung under the edge of the fender, after which the sleeve is raised between the wheel and the fender.

Having described the invention and its objects, what I claim as new and wish to protect by Letters Patent is:—

1. A gauge of the class described comprising a base, a vertical gauge arm pivotally mounted on said base and having sidewardly-extending members for contacting with the sides of a wheel, a scale associated with said gauge arm, a pointer associated with the base for indicating on the scale the camber angle of the wheel being tested, and a sleeve slidingly mounted on the gauge arm to enable it to be lengthened or shortened.

2. In combination; a gauge comprising a base, a vertical gauge arm pivotally mounted on said base and having sidewardly-extending members for contacting with the sides of a vehicle wheel, two contact arms slidingly mounted on the sidewardly-extending members and adapted to engage with the periphery of the wheel, means for locating said arms at an equal distance from the vertical gauge arm, a scale diagram for properly locating the wheels of a vehicle, said scale diagram having lines for indicating the distance between the front and the rear wheel of the vehicle; and a pointer associated with the base of the gauge for indicating, by aligning it with the lines of the scale diagram, the parallelism of the axles of the vehicle being tested.

3. In combination; a gauge comprising a base, a vertical gauge arm pivotally mounted on said base and having sidewardly-extending members for contacting with the sides of a vehicle wheel, two contact arms slidingly mounted on the sidewardly-extending members and adapted to engage with the periphery of the wheel, means for locating said arms at an equal distance from the vertical gauge arm, a scale diagram for properly locating the wheels of a vehicle, said scale diagram having lines for indicating the distance between the front and the rear wheel of the vehicle as well as the distance between each set of front and rear wheels; and a pointer associated with the base of the gauge for indicating, by aligning it with the lines of the scale diagram, the parallelism of the axles of the vehicle being tested.

4. In combination; a gauge comprising a base, a vertical gauge arm pivotally mounted on said base and having sidewardly-extending members for contacting with the sides of a vehicle wheel, two contact arms slidingly-mounted on the sidewardly-extending members and adapted to engage with the periphery of the wheel being tested, means for locating said arms at an equal distance from the vertical gauge arm, a scale diagram for properly locating the wheels of a vehicle, said scale diagram having lines for correctly locating the wheels of the vehicle; and means associated with the base of the gauge for alignment with the lines of the scale diagram to ascertain the angularity of the wheels in relation to the vehicle being tested.

5. In combination; a gauge comprising a base, a vertical gauge arm pivotally mounted on said base and having sidewardly-extending members for contacting with the sides of a vehicle wheel, two contact arms slidingly mounted on the sidewardly-extending members and adapted to engage with the periphery of the wheel being tested, means for locating said arms at an equal distance from the vertical gauge arm, a scale diagram for properly locating the wheels of a vehicle, said scale diagram having lines for correctly locating the wheels of the vehicle; and a means associated with the base of the gauge for alignment with the lines of the scale diagram to ascertain the angularity of the wheels in relation to the vehicle being tested, said means comprising a pointer and a graduated scale.

6. A gauge of the class described comprising a base, a vertical gauge arm pivotally mounted on said base and having sidewardly-extending members for contacting with the sides of a wheel, two contact arms slidingly mounted on the sidewardly-extending members and adapted to engage with the periphery of the wheel, means for locating said arms at an equal distance from the vertical gauge arm, a pointer and a scale associated with the gauge arm and the base for indicating the camber angle of the wheel being tested, and a sleeve slidingly mounted on the gauge arm to enable it to be lengthened or shortened.

OSWIN HAUCKE.